United States Patent

Wandschneider

[11] Patent Number: 5,855,843
[45] Date of Patent: Jan. 5, 1999

[54] GAS SINK IN THE FORM OF AN INTERSTITIAL FLUSHING DEVICE

[75] Inventor: Peter Wandschneider, Alken, Germany

[73] Assignee: Horst Knöllinger, Germany

[21] Appl. No.: 894,220

[22] PCT Filed: Jun. 28, 1995

[86] PCT No.: PCT/DE95/00848

§ 371 Date: Aug. 15, 1997

§ 102(e) Date: Aug. 15, 1997

[87] PCT Pub. No.: WO96/25259

PCT Pub. Date: Aug. 22, 1996

[30] Foreign Application Priority Data

Feb. 15, 1995 [DE] Germany ............... 195 04 941.1

[51] Int. Cl.⁶ ................................................. C21C 5/48
[52] U.S. Cl. ................................................. 266/220
[58] Field of Search ........................ 266/220, 217; 222/603

[56] References Cited

U.S. PATENT DOCUMENTS

| | | | |
|---|---|---|---|
| 5,225,143 | 7/1993 | Labate, II et al. | 266/220 |
| 5,286,004 | 2/1994 | Rothrock, Jr. | 266/220 |
| 5,423,521 | 6/1995 | Stover et al. | 266/220 |

Primary Examiner—Scott Kastler
Attorney, Agent, or Firm—Diller, Ramik & Wight, PC

[57] ABSTRACT

The invention concerns a gas-porous plug in the form of an interstitial flushing device in which the gas passage ducts are in the form of interstices. The opposite walls of the interstices are monolithically interconnected by flat bridges of refractory material. The gas-porous plug can be produced by means of a conical hollow body (1) whose side wall (2) comprises apertures (3). The hollow body (1) is inserted into a casting mould (4) which is subsequently filled with a refractory casting compound.

17 Claims, 1 Drawing Sheet

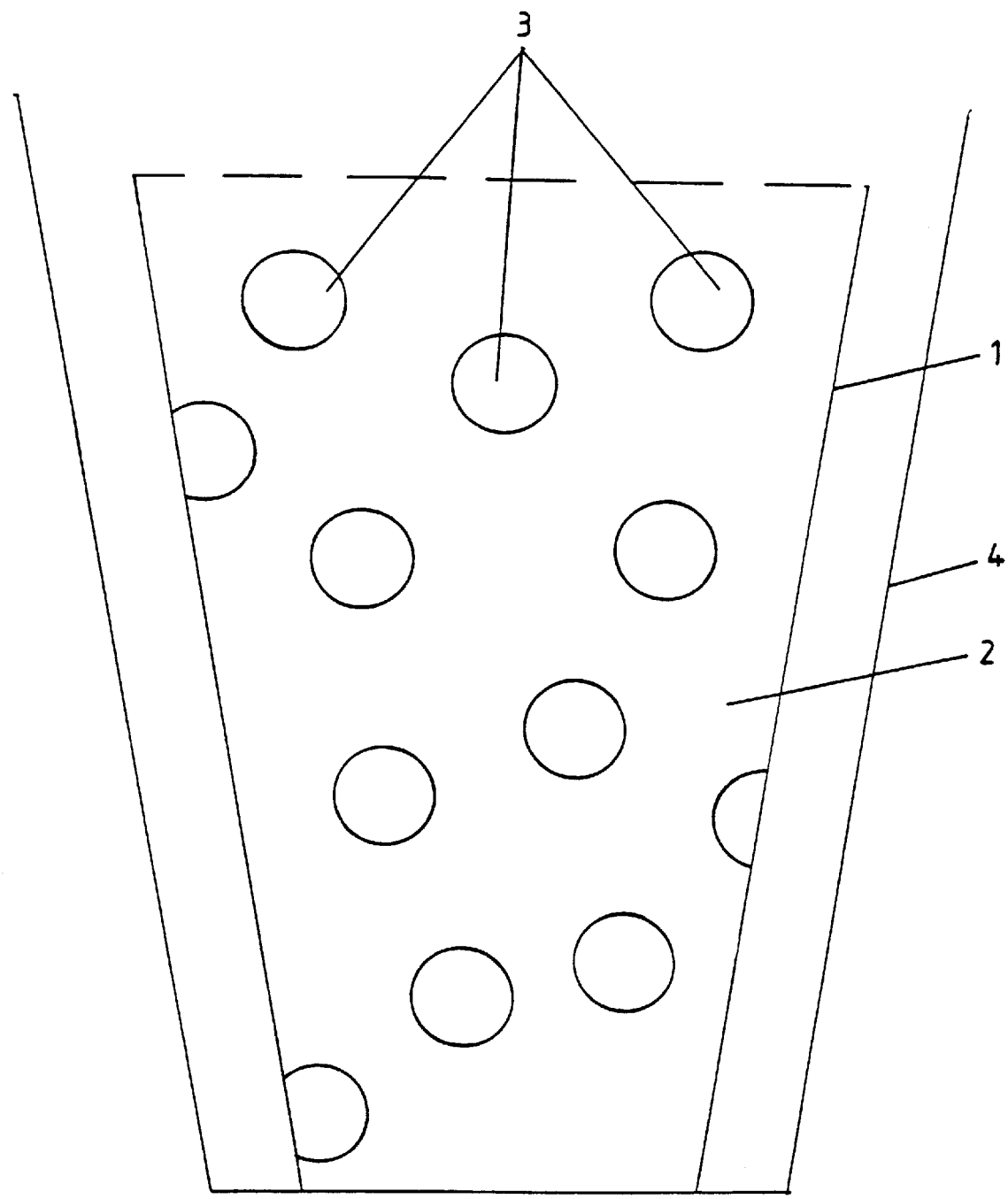

GAS SINK IN THE FORM OF AN INTERSTITIAL FLUSHING DEVICE

BACKGROUND OF THE INVENTION

The invention relates to a gas-porous plug for metallurgical vessels comprising a refractory moulding in which at least one gas passage duct is provided in the form of an interstice running through the plug from a cold side of the plug to a hot side thereof.

Gas-porous plugs of this type are referred to as so-called interstitial flushing devices and function to blow reaction or purification gases into molten metal or metal melts.

In the latter context, such gas-porous plugs are usually used in the base area of a refractory lining of a metallurgical vessel, particularly a steel ladle, and such metallurgical vessels are pressurized with compressed gas through a gas feed pipe.

Conventional gas-porous plugs are known which are constituted as an inner conically shaped refractory moulding or body over which a second outer conically shaped moulding is positioned. In order to define a gap between the inner and outer mouldings, strip-shaped spacers are inserted in the gap or interstices therebetween. Thus, such gas-porous plugs are not monolithic structures.

A peripheral side wall and a base area of such conventional gas porous plugs are also usually provided with a gas-tight, welded sheet metal casing having a base positioned at a distance from the underside or cold side of the gas-porous plug to create a gas feed chamber. A gas feed pipe is welded to the metal base and opens into the latter gas feed chamber.

In another conventional gas-porous plug, the interstice is formed between the side of the sheet metal casing and the refractory moulding. However, such gas-porous plugs are no longer used owing to their relatively low wear resistance.

Another gas-porous plug of a conventional construction is disclosed in DE-OS 43 12 988 in which gas passage ducts are defined as a three-dimensional network in the interior of a monolithically cast refractory moulding utilizing a conventional tensioning device. However, the manufacture of this gas-porous plug is relatively complicated and the inner gas passage ducts are also relatively long which results in comparative high pressure gas losses when in use.

In another conventional gas-porous plug disclosed in DE-OS 38 23 897, threads or strips are inserted into a casting mould utilizing a tensioning device which is pulled or burnt out after the moulding has set. This moulding is also manufactured as a monolithic structure but the tensioning of the individual threads constitutes a relatively complicated manufacturing process.

SUMMARY OF THE INVENTION

This invention is directed to a novel gas-porous plug and the manufacture thereof in a relatively simplified fashion. The gas-porous plug of the present invention is defined by an inner body which is surrounded by an outer body with a peripheral gap therebetween. The peripheral gap is spanned by a plurality of bridges. The inner and outer bodies and the plurality of bridges are formed as a single piece of monolithic cast refractory material.

Preferably, the gas-porous plug is manufactured by placing an open hollow body in the form of a generally conical sleeve having apertures in a side wall thereof into a casting mould with an exterior surface of the sleeve spaced from an interior surface of the casting mould. This hollow body or sleeve is made from material that can be burnt or melted out. The casting mould is then filled with refractory casting compound which fills the sleeve-like body, the openings thereof and a peripheral gap between the exterior of the sleeve and the interior of the mould surface. The sleeve is then burnt or melted out, and the gas-porous plug remains and is defined by a single piece of monolithic cast refractory material formed of an inner body, an outer body and a plurality of bridges therebetween.

The gas-porous plug thus constructed in accordance with this invention displays directed porosity and possesses characteristics of both an interstitial flushing device and a gas-porous plug with individual gas passage ducts. In contrast to conventional interstitial flushing devices, the refractory material bridges span the gap or interstice between the inner and outer bodies and thus monolithically connect the same to each other. Owing to this monolithic construction, the gas-porous plug displays excellent durability and the volume of the gas which is injected into the molten metal or melt can be precisely regulated in a relatively simple manner by varying, for ample, the thickness of the peripheral gap or interstices or the size and number of bridges spanning the same as a function of the operating pressure of the flushing gas.

Additionally, the bridges spanning the peripheral gap or interstice create eddies in the gas as it flows through the gas-porous plug. Such gas eddies result in the gas leaving the hot side of the gas-porous plug in a highly desired turbulent flow which allows fine distribution thereof inside the metal melt. The latter not only improves the flushing effect of the gas thus injected into the molten metal, but simultaneously this also prevents excessive flow velocities occurring on the hot side of the plug which would otherwise result in increase wear of the gas-porous plug.

In order to increase the volume of the injected gas, a plurality of interstices can be provided, preferably ending in concentric circles or semi-circles on the hot side of the flushing device. An optical wear indicator can also be readily provided the gas-porous plug to reflect in-use wear, particularly at a lower end area of the gas-porous plug. Once the gas-porous plug is worn down in the lower area, a dark inner area will be visible, thus providing an optical indication of the wear status of the plug. Gas-porous plugs with such optical wear indicators are known, for example, from European Patent Application 0 325 709.

The open hollow body or sleeve having the apertures therein is preferably made of plastic to allow it to be melted or burnt out of the cast refractory material gas-porous plug. Preferably, this apertured sleeve is of a conical configuration having a narrower end which is preferably placed on the bottom of the associated casting mould. This allows the mould and the sleeve to be readily filled from the top. The narrower bottom end of the eventually cast gas-porous plug constitutes the hot side thereof, whereas the larger upper end is the cold side thereof. Preferably, the apertured plastic sleeve is burnt or melted out after the refractory material cast in the mould has set or during its drying, and this leaves behind the generally peripheral gap spanned by the bridges which additionally monolithically unite the inner and outer bodies which are respectively preferably substantially conical and conically sleeve-like.

If desired the wear resistance of the gas-porous plugs can be increased by incorporated carbon carriers into the refractory casting material prior to the casting operation earlier described.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWING

The FIGURE is a schematic front view of a mould and an apertured sleeve inserted in the mould prior to the performance of a casting operation to form a gas-porous plug.

DESCRIPTION OF THE PREFERRED EMBODIMENTS

A conical hollow body or sleeve 1 is illustrated inserted substantially centrally in a likewise conical casting mould 4 with substantial equal circumferential/peripheral spacing therebetween. The conical hollow body or sleeve 1 includes an opening at the top and a side wall 2 thereof includes a plurality of substantially circular apertures or openings 3.

The casting mould 4 is filled with free flowing refractory compound material which fills the gap between the sleeve 2 and the inner surface of the mould 4, the interior of the sleeve 2 and the openings or apertures 3 therein. Since the casting compound or material flows into and fills the apertures 3 during pouring, corresponding bridges are formed in the apertures 3 spanning and eventually uniting what eventually becomes the exterior hollow sleeve-like outer body of the gas-porous plug and the conical interior body thereof. After filling the refractory casting compound in the mould 4, the latter can be vibrated and the material otherwise compacted, as is customary and conventional.

After the refractory material has set or during its drying, the plastic sleeve 2 can be burnt or melted out resulting in the as-porous plug essentially being defined as a one-piece monolithic cast refractory member formed by a conical inner body, a conical sleeve-like outer body, and a plurality of bridges therebetween.

Although a preferred embodiment of the invention has been specifically illustrated and described herein, it is to be understood that minor variations may be made in the apparatus without departing from the spirit and scope of the invention, as defined the appended claims.

I claim:

1. A gas-porous plug for metallurgical vessels comprising an inner body surrounded by an outer body with a peripheral gap therebetween, said peripheral gap being spanned by a plurality of bridges, and said inner and outer bodies and said plurality of bridges being a single piece of monolithic refractory material.

2. The gas porous plug as defined in claim 1 wherein said inner body is of a substantially conical configuration.

3. The gas porous plug as defined in claim 1 wherein said outer body is of a substantially conical configuration.

4. The gas porous plug as defined in claim 1 wherein said inner and outer bodies are each of a substantially conical configuration.

5. The gas porous plug as defined in claim 1 wherein said outer body is substantially a sleeve.

6. The gas porous plug as defined in claim 1 wherein said outer body is substantially a conical sleeve.

7. The gas porous plug as defined in claim 1 wherein said refractory material is cast material.

8. The gas porous plug as defined in claim 2 wherein said outer body is substantially a sleeve.

9. The gas porous plug as defined in claim 2 wherein said outer body is substantially a conical sleeve.

10. The gas porous plug as defined in claim 2 wherein said refractory material is cast material.

11. The gas porous plug as defined in claim 4 wherein said outer body is substantially a sleeve.

12. The gas porous plug as defined in claim 4 wherein said outer body is substantially a conical sleeve.

13. The gas porous plug as defined in claim 4 wherein said refractory material is cast material.

14. A method of manufacturing a gas-porous plug comprising the steps of:

(a) providing a sleeve having a plurality of aperture extending transversely therethrough, (b) inserting the sleeve in a mould having an interior moulding surface spaced from an exterior surface of said sleeve, (c) casting a refractory casting compound interiorly and exteriorly of said sleeve and in said apertures, and (d) burning or melting out the sleeve to thereby form the gas-porous plug as a one-piece monolithic casting defined by substantially spaced inner and outer bodies joined by a plurality of bridges therebetween.

15. The gas-porous plug manufacturing method as defined in claim 14 wherein the sleeve has an exterior conical surface and the interior molding surface is conical whereby the outer body is a conical sleeve.

16. The method of manufacturing a gas-porous plug as defined in claim 14 wherein the inner body is substantially of a conical configuration.

17. The method of manufacturing a gas-porous plug as defined in claim 15 wherein the inner body is substantially of a conical configuration.

* * * * *